(12) United States Patent
Kruspe

(10) Patent No.: US 8,803,521 B2
(45) Date of Patent: Aug. 12, 2014

(54) ANTENNA APPARATUS AND METHOD FOR INSULATING

(75) Inventor: Thomas Kruspe, Wietzendorf (DE)

(73) Assignee: Baker Hughes Incorporated, Houston, TX (US)

( * ) Notice: Subject to any disclaimer, the term of this patent is extended or adjusted under 35 U.S.C. 154(b) by 474 days.

(21) Appl. No.: 13/272,862

(22) Filed: Oct. 13, 2011

(65) Prior Publication Data

US 2012/0092016 A1  Apr. 19, 2012

Related U.S. Application Data

(60) Provisional application No. 61/392,737, filed on Oct. 13, 2010.

(51) Int. Cl.
*G01V 3/00* (2006.01)
*H01B 13/14* (2006.01)
*G01V 3/32* (2006.01)

(52) U.S. Cl.
CPC ........... *H01B 13/148* (2013.01); *G01V 3/32* (2013.01)
USPC .......................................................... 324/303

(58) Field of Classification Search
USPC .................................................. 324/300–322
See application file for complete search history.

(56) References Cited

U.S. PATENT DOCUMENTS

| | | | | |
|---|---|---|---|---|
| 4,628,495 A * | 12/1986 | Peppers et al. | ................... | 367/85 |
| 4,794,322 A * | 12/1988 | Davies | ........................... | 324/347 |
| 4,799,546 A * | 1/1989 | Hensley et al. | ............ | 166/254.2 |
| 5,359,324 A * | 10/1994 | Clark et al. | ................. | 340/854.3 |
| 5,375,659 A * | 12/1994 | Gilbert et al. | .................. | 166/264 |
| 5,661,402 A | 8/1997 | Chesnutt et al. | | |
| 5,923,167 A * | 7/1999 | Chang et al. | ................... | 324/303 |
| 6,008,646 A | 12/1999 | Griffin et al. | | |
| 6,506,083 B1 | 1/2003 | Bickford et al. | | |
| 7,277,025 B2 * | 10/2007 | Allan | ........................... | 340/854.8 |
| 7,408,837 B2 * | 8/2008 | Harvey | ........................... | 367/85 |
| 7,436,183 B2 * | 10/2008 | Clark | ........................... | 324/338 |
| 7,565,834 B2 * | 7/2009 | Adnan et al. | ................ | 73/152.12 |
| 7,573,397 B2 * | 8/2009 | Petrovic et al. | ............ | 340/854.6 |
| 7,671,597 B2 * | 3/2010 | Finci et al. | ...................... | 324/347 |
| 7,759,942 B2 * | 7/2010 | Clark et al. | .................... | 324/347 |
| 2001/0045829 A1 | 11/2001 | Prammer et al. | | |

FOREIGN PATENT DOCUMENTS

WO   WO2004067901 A1   8/2004

OTHER PUBLICATIONS

International Search Report and the Written Opinion of the International Searching Authority, or the Declaration for International Application No. PCT/US2011/055782; all references are cited above.

* cited by examiner

*Primary Examiner* — Dixomara Vargas
(74) *Attorney, Agent, or Firm* — Cantor Colburn LLP

(57) ABSTRACT

In one aspect, a method for insulating an antenna apparatus is provided, the method including coupling a transition piece to a bulkhead, wherein the bulkhead includes a first conductive path electrically coupled to a second conductive path in the transition piece and coupling an antenna cable to the transition piece, wherein the antenna cable includes a third conductive path electrically coupled to the second conductive path. The method further includes disposing an electrically insulating polymer on the bulkhead, transition piece, and antenna cable, wherein the insulating polymer is disposed by extrusion.

20 Claims, 4 Drawing Sheets

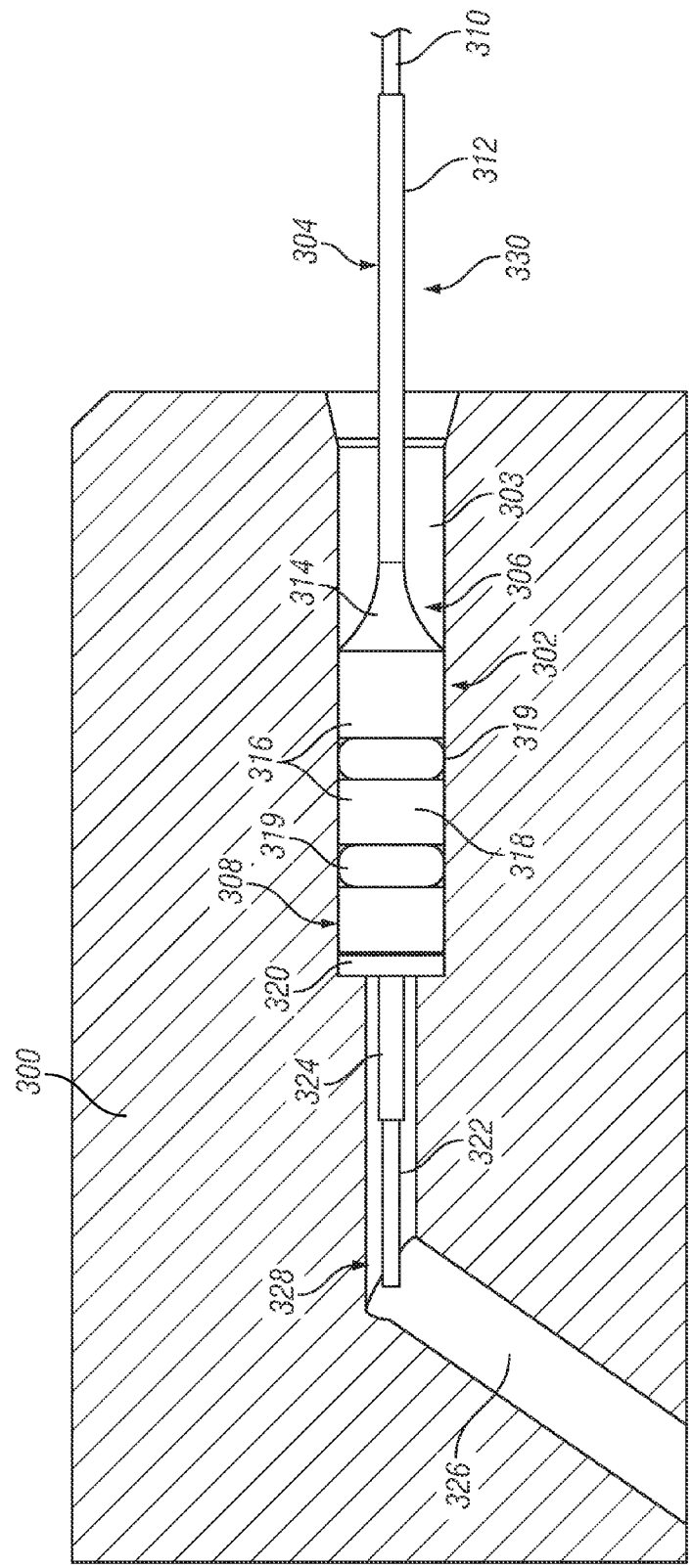

ANTENNA APPARATUS AND METHOD FOR INSULATING

CROSS-REFERENCE TO RELATED APPLICATIONS

This application takes priority from U.S. Provisional Application Ser. No. 61/392,737, filed on Oct. 13, 2010, which is incorporated herein in its entirety by reference.

BACKGROUND

1. Field of the Disclosure

This invention relates generally to logging tool apparatus and techniques for logging wells. More specifically, the invention relates to antenna assemblies for nuclear magnetic resonance (NMR) well logging apparatus.

2. Background of the Related Art

To obtain hydrocarbons such as oil and gas, a drilling assembly (also referred to as the "bottom hole assembly" or the "BHA") carrying a drill bit at its bottom end is conveyed into the wellbore or borehole. Bottom hole assemblies ("BHA") generally include several formation evaluation sensors for determining various parameters of the formation surrounding the BHA during the drilling of the wellbore. Such sensors are usually referred to as the measurement-while-drilling ("MWD") sensors. Such sensors traditionally have electromagnetic propagation sensors for measuring the resistivity, dielectric constant, or water saturation of the formation, nuclear magnetic resonance ("NMR") sensors for determining the porosity of the formation and acoustic sensors to determine the formation acoustic velocity and porosity.

NMR sensors utilize permanent magnets to generate a static magnetic field in the formation surrounding the MWD tool. A radio frequency (RF) coil disposed between the magnets or around the magnets induces a RF magnetic field. The magnets and the RF coils are positioned so that the static and RF fields are perpendicular to each other at least over a portion of the formation surrounding the NMR tool. The NMR measurements corresponding to the formation are used to determine the formation parameters of interest.

The antenna assembly includes parts which are exposed to the wellbore pressure. Exposure to high pressures, high temperatures, and corrosive fluids may cause degradation of certain antenna assembly parts. For example, in wellbores in gas producing formations, rubber and plastic parts of antenna assemblies may degrade over time due to exposure to high pressures, causing fluid to leak into the tool, causing short circuits and damaging electronics and electrical components. In addition, rubber components can suffer from explosive decompression when applied under downhole conditions and retrieved back to surface again. This process may destroy the rubber and can make the tool unusable without repair.

SUMMARY OF THE DISCLOSURE

In one aspect, a method for insulating an antenna apparatus is provided, the method including coupling a transition piece to a bulkhead, wherein the bulkhead includes a first conductive path electrically coupled to a second conductive path in the transition piece and coupling an antenna cable to the transition piece, wherein the antenna cable includes a third conductive path electrically coupled to the second conductive path. The method further includes disposing an electrically insulating polymer on the bulkhead, transition piece, and antenna cable, wherein the insulating polymer is disposed by extrusion.

In another aspect, a downhole antenna apparatus is provided, the apparatus including a bulkhead and a transition piece coupled to the bulkhead. The apparatus further includes an antenna cable coupled to the transition piece, wherein the antenna cable is electrically coupled to a conductive path in the transition piece and the bulkhead and an electrically insulating coating disposed about the bulkhead, transition piece, and antenna cable, wherein the electrically insulating coating comprises a single piece configured to withstand at least about 300 bar of pressure outside the downhole antenna apparatus wherein the electrically insulating coating prevents fluid flow into the downhole antenna apparatus.

Examples of certain features of apparatus and method for assessing quality of data have been summarized rather broadly in order that the detailed description thereof that follows may be better understood. There are, of course, additional features of the apparatus and method disclosed hereinafter that will form the subject of the claims made pursuant to this disclosure.

BRIEF DESCRIPTION OF THE DRAWINGS

The illustrative embodiments and their advantages will be better understood by referring to the following detailed description and the attached drawings, in which:

FIG. 3 is a side view of an embodiment of an antenna assembly positioned in a downhole tool.

DESCRIPTION OF EMBODIMENTS

Figure 1:
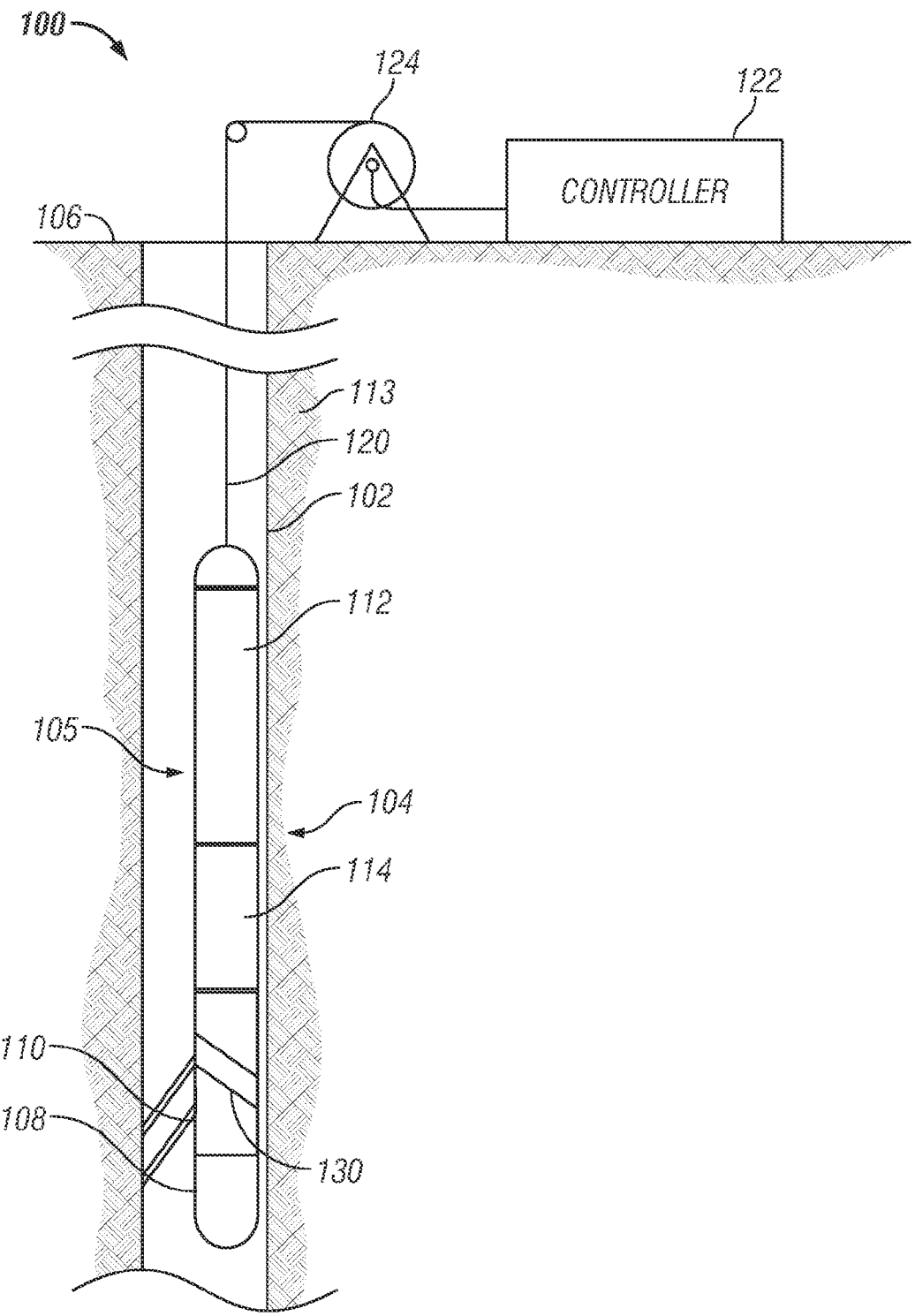
FIG. 1 shows a schematic diagram of an embodiment of a downhole tool disposed in a wellbore of a formation.

FIG. 1 shows an embodiment of a logging system 100 used in a borehole 108 to obtain measurements related to a property of a surrounding earth formation. The borehole may include a cased portion and/or an open hole portion. Shown in FIG. 1 is a suite of logging instruments 104 disposed on a downhole tool 105 (or "tool body") within a borehole 108 penetrating the earth formation 113, illustrated in vertical section, and coupled to equipment at the surface 110. Logging instrument suite 104 includes one or more devices referred to as formation evaluation (FE) sensors used in the borehole for logging operations. Non-limiting examples of formation evaluation sensors include resistivity sensors for determining the formation resistivity and dielectric constant, nuclear sensors for determining the formation density, neutron porosity and certain formation characteristics, nuclear magnetic resonance sensors for determining the porosity and other petrophysical characteristics of the formation. It should be understood that the term formation evaluation sensor encompasses measurement devices, sensors, and other like devices that, actively or passively, collect data pertaining to the various characteristics of the formation, directional sensors for providing information about the tool orientation and direction of movement, formation testing sensors for providing information about the characteristics of the reservoir fluid and for evaluating the reservoir conditions. Direction and position sensors, including a combination of one or more accelerometers and one or more gyroscopes or magnetometers, can be used to provide direction and position measurements along three axes. In one embodiment, the formation evaluation sensors can collect formation fluid samples and determine a property of the formation fluid to yield a formation property such as formation pressure.

Exemplary formation evaluation sensors can include a core sampling device 108, a Nuclear Magnetic Resonance (NMR) device 110, a resistivity device 112, and a natural gamma ray device 114. Instrument suite 104 is conveyed within borehole 108 by a cable 120 containing electrical conductors and optical transmission cables (not illustrated) for communicating electrical and optical signals between instrument suite 104 and the surface electronics, indicated generally at 122, located at the surface 106. Logging devices 108, 110, 112, and 114 within instrument suite 104 are cooperatively coupled such that electrical and/or optical signals can be communicated between each device and controller 122. Cable 120 is attached to a drum 124 at the surface 106. Instrument suite 104 is caused to traverse borehole 108 by spooling cable 120 on to or off of drum 124.

Controller 122 can include electronic circuitry and photon counters to operate and control devices 108, 110, 112, and 114 within instrument suite 104 and to process the data therefrom. In addition, controller 122 contains power supplies for operation of the logging devices within instrument suite 104 and further contains electronic circuitry and optical circuitry as is necessary to process and normalize the signals from devices 108, 110, 112, and 114 in a conventional manner to yield generally continuous records, or logs, of data pertaining to the formations surrounding borehole 108. In one aspect, these logs can then be electronically stored in data storage prior to further processing. As depicted, the NMR sensor 110 includes an antenna assembly 130 configured to emit and/or sense a formation parameter using selected signals, such as radio frequency (RF) signals. A portion of the antenna assembly 130 may be exposed to high wellbore pressure, while a second portion of the antenna assembly 130 is located inside the tool 105. The portion of the antenna assembly 130 located inside the tool 105 is at a lower pressure relative to the wellbore pressure. It should be noted that the antenna assembly 130 and tool 105 described herein may be used in several downhole applications, including but not limited to, slickline, wireline, and measurements-while-drilling applications. The exemplary antenna assembly 130 may apply to any suitable application such as using a sensor and an antenna in the borehole 108 for measurements of formation resistivity and conductivity. Further, the antenna assembly 130 may also be used for communication purposes wherein communication uses an antenna exposed to borehole fluid. As discussed in detail with reference to FIGS. 2A, 2B, and 3, an antenna assembly is provided that has improved durability and reduced downtime.

Figure 2A:
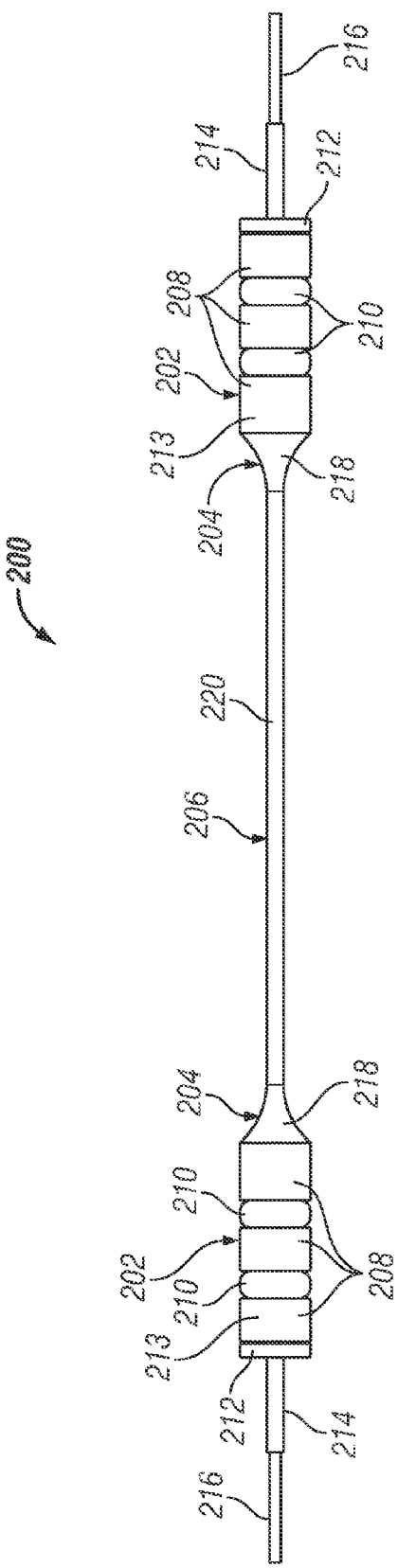
FIG. 2A is a side view of an embodiment of an antenna assembly.
Figure 2B:
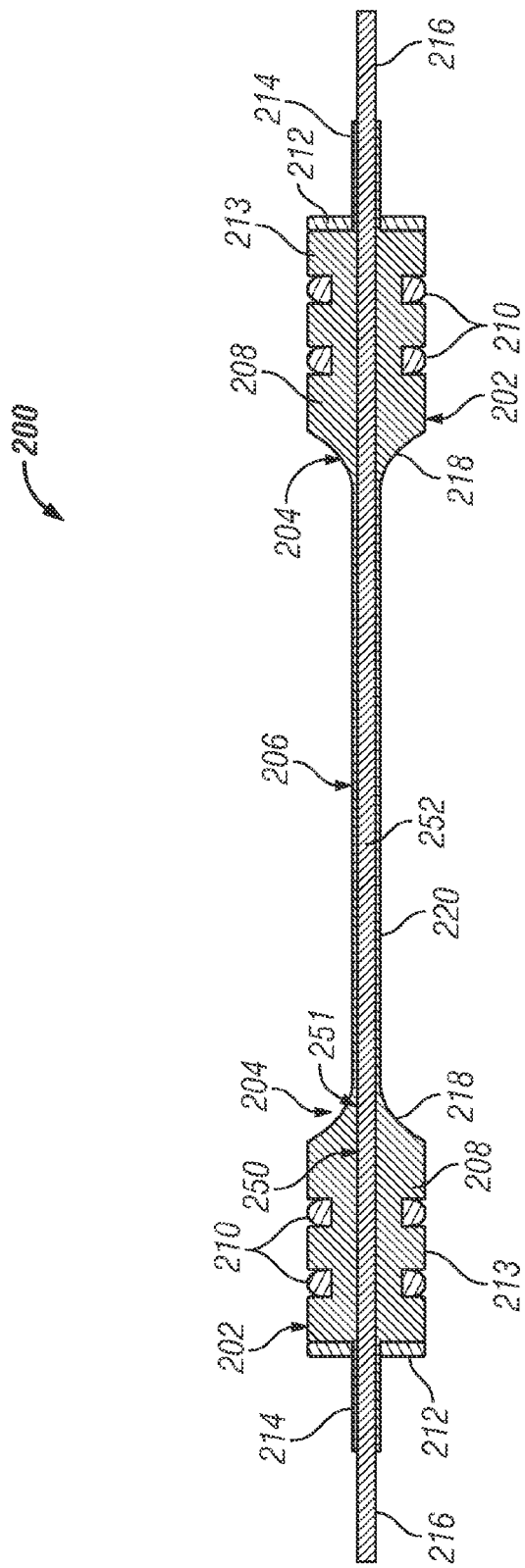
FIG. 2B is a sectional side view of the antenna assembly shown in FIG. 2A.

FIG. 2A is a side view of an embodiment of an antenna apparatus 200 to be installed in a downhole tool. FIG. 2B is a sectional side view of the antenna apparatus 200. Both illustrations are discussed below to further describe the exemplary embodiment. The antenna apparatus 200 includes a pair of bulkheads 202, a pair of transition pieces 204, and antenna cable 206. Each bulkhead 202 includes a member 208 (or "body") and seals 210. The seals 210 are configured to prevent fluid flow from a wellbore or annulus to the inside of the downhole tool. In one embodiment, the seals 210 are O-rings. The bulkheads 202 each further include a washer 212, such as a steel washer, to support the bulkhead 202. An outer portion of the member 208 is formed from an electrically insulating coating 213, such as a polymer, where the coating 213 protects and isolates inner parts of the bulkhead 202. An electrically insulating or protective coating 214 also covers a conductive path 216, which is electrically coupled to a conductive path 250 within each bulkhead 202. The conductive path 216 leads to electronic devices or circuitry within the tool or uphole, configured to process, receive and/or send signals transmitted by the antenna assembly 200.

The bulkheads 202 are also each electrically coupled to the transition pieces 204 which include an electrically insulating coating 218 to protect and insulate conductive path 251 leading in the transition piece 204. The transition pieces 204 are located on each end of the antenna cable 206. The antenna cable 206 includes an electrically insulating coating 220 configured to protect and isolate a conductive path 252. As depicted, the antenna cable 206, bulkheads 202, and transition pieces 204 are configured to be exposed to the high pressure and temperatures experienced downhole. The protective and insulating coatings 213, 218, and 220 are configured to protect the antenna assembly 200 from wear due to downhole conditions. For example, the coatings 213, 218, and 220 are polymers formed around inner parts of the antenna assembly 200, such as conductive paths 250 and 252 to prevent creep and reduce leakage of fluids (gas and/or liquids) into the downhole tool. The insulating coatings 213, 218, and 220 may be formed from a suitable durable insulating material, including such non-limiting examples as polymers, toughened ceramics or combination thereof. For example, the insulating coatings 213, 218, and 220 are a durable insulating polymer that has a resistivity of at least about $10^8$ to $10^{14}$ ohms. An example of a polymer is polyether etherketone ("PEEK"). The coatings 213, 218, and 220 protect components downhole from conductive fluids at high temperatures as well as from a pressure differential caused by the high pressure surrounding the tool in the wellbore relative to the low or ambient pressure within the tool. In aspects, the conductive paths may include one or more conductive members, including, but not limited to, copper or copper alloy wires.

FIG. 3 is a side view of an embodiment of a portion of a downhole tool 300 and an antenna assembly 302. The downhole tool 300 includes a cavity 303 configured to receive the antenna assembly 302 via suitable method, such as press fitting or brazing. The antenna assembly 302 includes an antenna cable 304 coupled to a transition piece 306, which is in turn coupled to a bulkhead 308. The antenna cable 304 includes a conductive path 310 that is protected and insulated by an insulating coating 310. The conductive path 310 is electrically coupled to transmit signals to a conductive path within transition piece 306 protected by insulating coating 314. The bulkhead 308 includes a body 316 that is at least partially formed from an insulating coating 318. The bulkhead 308 also includes seals 319 and a washer 320. The bulkhead 308 includes a conductive path coupled to the conductive path within transition piece 306 as well as a conductive path 322 within cable 324. In an embodiment, the cable 324 is coupled to electronic devices (not shown), such as a transmitter or receiver circuit or antenna driver-integrated circuit, via cavity 326 within the tool 300. In one aspect, the conductive path in the bulkhead 308, the conductive path in the transition piece 306, and the conductive path 322 in the antenna cable 324 are a separate conductive wires or conductive members, coupled by soldering or other suitable coupling methods. In other aspects, the conductive path in the bulkhead 308, the conductive path in the transition piece 306, and the conductive path 322 in the antenna cable 324 are a single conductive path, wherein the conductive path could comprise a single conductive wire.

In the exemplary embodiment, the antenna assembly 302 provides a durable and simple structure to substantially seal and protect internal components in a lower pressure area 328 of the tool from the downhole conditions in high pressure area 330. The antenna cable 304, transition piece 306, and bulkhead 308 may be separate parts or one piece. Further, corresponding insulating coatings 312, 314, and 318 may be formed as one piece over the entire antenna assembly 302 or may be formed over each piece individually. In addition, the insulating coatings 312, 314, and 318 may be different materials, such as ceramics or polymers, with different strengths and pressure/temperature resistant capabilities. In one embodiment, insulating coatings 312, 314, and 318 are one polymer, wherein the polymer is formed over the parts 304, 306, and 308 by extrusion or sintering.

In another embodiment, the electrically insulating coating 312 comprises a first polymer and the electrically insulating coatings 314 and 316 are a second polymer that is a higher strength polymer than the first polymer.

In one embodiment, the insulating coatings 312, 314, and 318 are polymers such as organic polymers. Examples of suitable organic polymers are thermoplastic polymers, thermosetting polymers, blends of thermoplastic polymers, blends of thermosetting polymers, and blends of thermoplastic polymers with thermosetting polymers. The organic polymer can be a homopolymer, a copolymer, a block copolymer, an alternating copolymer, an alternating block copolymer, a random copolymer, a random block copolymer, a graft copolymer, a star block copolymer, an ionomer, a dendrimer, or a combination comprising at least one of the foregoing polymers. An exemplary polymer is a thermoplastic polymer.

In one embodiment, it is desirable to use polymers that have a glass transition temperature greater than or equal to about 200° C. In another embodiment, it is desirable to use polymers that have a melting temperature that is greater than or equal to about 200° C. Polymers that have melting temperatures and glass transition temperatures less than or equal to about 200° C. can be used in the present invention and can withstand downhole temperatures if they are subjected to sufficient crosslinking to prevent flow of the polymer at a temperature less than or equal to about 200° C.

In another embodiment, it is desirable for the polymer to not flow at temperatures less than or equal to about 250° C., specifically at temperatures of less than or equal to about 300° C. In yet another embodiment, the polymer can mechanically withstand high pressures without deforming. In one example, the insulating coating is a single piece on the assembly configured to withstand at least about 300 bar of pressure difference between inside the apparatus and outside the apparatus. The antenna assembly retains the desired sealing and insulating properties at pressures up to about 30,000 pounds-per-square-inch (psi). In addition, the exemplary polymer does not chemically decompose at high temperatures. Accordingly, the molecular links of the exemplary polymer do not break down at downhole temperatures of up to about 200 degrees Celsius. In addition, the insulating coating is capable of withstanding exposure to chemicals downhole, such as water-based mud including additives. Further, the insulating coating is inert to gas diffusion, and is thereby resistant to explosive decompression that can be caused by gas expansion in materials.

Examples of thermoplastic polymers are polyacetals, polyolefins, polyacrylics, polycarbonates (PC), polystyrenes (PS), polyesters, polyamides (PA), polyamideimides, polyarylates, polyarylsulfones, polyethersulfones (PES), polyphenylene sulfides, polyvinyl chlorides (PVC), polysulfones, polyimides (PI), polyetherimides (PEI), polytetrafluoroethylenes (PTFE), polyetherketones (PEK), polyether etherketones (PEEK), polyether ketone ketones (PEKK), polybenzoxazoles, polybenzimidazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane (PU), ethylene propylene diene rubber (EPR), polytetrafluoroethylene, fluorinated ethylene propylene, perfluoroalkoxyethylene, polychlorotrifluoroethylene, polyvinylidene fluoride, polysiloxanes, or the like, or a combination comprising at least one of the foregoing organic polymers. An exemplary thermoplastic polymer is polyether ether ketone.

Examples of thermosetting polymers suitable for use in the polymeric composition include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination comprising at least one of the foregoing thermosetting polymers.

Examples of blends of thermoplastic polymers include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleicanhydride/acrylonitrile-butadiene-styrene, polyether etherketone/polyethersulfone, polyether etherketone/polyetherimide, polyethylene/nylon, polyethylene/polyacetal, or the like. An exemplary polymeric blend is a polyether etherketone/polyethersulfone blend or a polyether etherketone/polyetherimide blend.

In one embodiment, in one method of manufacturing the polymer coatings 312, 314, and 318 may be extruded onto the antenna assembly 302 using cross-head extrusion. In this method of extrusion, the antenna assembly 302 is fed through the die while a single polymer sleeve that comprises the polymer coatings 312, 314, and 318 is disposed upon at least of portion of each of the antenna cable 304, transition piece 306, and bulkhead 308. The polymer sleeve is a single piece that is continuous and of a uniform thickness throughout the length of the antenna cable 304, transition piece 306, and bulkhead 308. In another embodiment, the polymer sleeve comprises multiple pieces that can comprise the same or different polymers.

In another embodiment, the polymer may be extruded separately and then disposed onto the antenna cable 304, transition piece 306, and bulkhead 308. In this embodiment, the polymer is first extruded in the form of a tube. The tube is then split open along its length. After being split open it is disposed onto the antenna cable 304, transition piece 306, and bulkhead 308. An adhesive coating may be disposed between the antenna cable 304, transition piece 306, and bulkhead 308 and the polymer to prevent movement of the polymer on the antenna cable 304, transition piece 306, and bulkhead 308.

In yet another embodiment, the electrically insulating coatings 312, 314, and 318 are ceramic compositions. Examples of suitable ceramic compositions for use in the antenna assembly 302 include, but are not limited to, hard phase oxides such as $Al_2O_3$, $Cr_2O_3$, $ZrO_2$, $TiO_2$, $SiO_2$, $Y_2O_3$, $CeO_2$, and the like; metal carbides such as $Cr_3C_2$, WC, TiC, ZrC, $B_4C$, and the like; diamond; metal nitrides such as cubic BN, TiN, ZrN, HfN, $Si_3N_4$, AlN, and the like; metal borides such as $TiB_2$, $ZrB_2$, LaB, $LaB_6$, $W_2B_2$, $AlB_2$, and the like; and combinations comprising at least one of the foregoing compositions. The wear characteristics of hard phase metal oxides, carbides, nitrides, and borides are superior to biomimetic materials such as hydroxyapatite and other phosphate-based materials.

In an embodiment, the electrically insulating ceramic coatings 312, 314, and 318 are a biocompatible nanostructured ceramic that is a composite comprising at least 51 volume (vol) %, based on the total volume of the composite, of a nanostructured ceramic composition; and a nanostructured binder phase composition comprising a relatively soft and low melting ceramic material. The concentration of the binder phase can be, for example, about 0 weight (wt) % to about 50 wt %, based on the total weight of the composite. Suitable ceramic binder phase compositions for the composite include, but are not limited to, $SiO_2$, $CeO_2$, $Y_2O_3$, $TiO_2$, and combinations comprising at least one of the foregoing ceramic binder phase compositions.

In an embodiment, the insulating ceramic coatings 312, 314, and 318 comprise a toughened ceramic. In other embodiments insulating coatings 312, 314, and 318 comprise a combination of ceramic and polymers.

The disclosure herein describes particular embodiments of the disclosure. Such embodiments are not to be construed as limitations to the concepts described herein. Various modifications to the apparatus ad methods described herein will be apparent to persons of ordinary skill in the art. All such modifications are considered a part of the disclosure herein.

The invention claimed is:

1. A downhole antenna apparatus, comprising:
   a bulkhead;
   a transition piece coupled to the bulkhead;
   an antenna cable coupled to the transition piece, wherein the antenna cable is electrically coupled to a conductive path in the transition piece and the bulkhead; and
   an electrically insulating coating disposed about the bulkhead, transition piece, and antenna cable, wherein the electrically insulating coating comprises a single piece configured to withstand at least about 300 bar of pressure outside the downhole antenna apparatus wherein the electrically insulating coating prevents fluid flow into the downhole antenna apparatus.

2. The apparatus of claim 1, wherein the electrically insulating coating is a polymer disposed on the bulkhead, transition piece, and antenna cable by extrusion.

3. The apparatus of claim 1, wherein the electrically insulating coating does not flow at temperatures lower than 200 degrees Celsius.

4. The apparatus of claim 1, wherein the electrically insulating coating comprises a thermoplastic polymer or a thermosetting polymer.

5. The apparatus of claim 1, wherein the electrically insulating coating comprises a toughened ceramic.

6. The apparatus of claim 1, wherein the electrically insulating coating comprises a polyether ether ketone.

7. The apparatus of claim 1, wherein the electrically insulating coating comprises a polyimide or a polysulfone.

8. The apparatus of claim 1, wherein the electrically insulating coating is inert to gas diffusion.

9. A method for insulating an antenna apparatus, the method comprising:
   coupling a transition piece to a bulkhead, wherein the bulkhead comprises a first conductive path electrically coupled to a second conductive path in the transition piece;
   coupling an antenna cable to the transition piece, wherein the antenna cable comprises a third conductive path electrically coupled to the second conductive path; and
   disposing an electrically insulating polymer on the bulkhead, transition piece, and antenna cable, wherein the electrically insulating polymer is disposed by extrusion.

10. The method of claim 9, wherein disposing the electrically insulating polymer comprises disposing an electrically insulating polymer that does not flow at temperatures lower than 200 degrees Celsius.

11. The method of claim 9, wherein disposing the electrically insulating polymer comprises disposing a first polymer on the antenna cable and the electrically insulating polymer disposed on the bulkhead is a second polymer that is a higher strength polymer than the first polymer.

12. The method of claim 9, wherein disposing the electrically insulating polymer comprises disposing a thermoplastic polymer or a thermosetting polymer.

13. The method of claim 9, wherein disposing the electrically insulating polymer comprises disposing a polyether ether ketone.

14. The method of claim 9, wherein disposing the electrically insulating polymer comprises disposing a polyimide or a polysulfone.

15. A downhole antenna apparatus, comprising:
   a bulkhead comprising an electrically insulating material;
   a transition piece coupled to the bulkhead, the transition piece comprising the electrically insulating material; and
   an antenna cable coupled to the transition piece, wherein the antenna cable comprises a conductive path extending through the transition piece and the bulkhead, the antenna cable comprising the electrically insulating material and the conductive path insulated by the electrically insulating material, wherein the electrically insulating material can mechanically withstand up to about 30,000 psi and does not chemically decompose at temperatures up to about 200 degrees Celsius.

16. The apparatus of claim 15, wherein the electrically insulating material comprises a polyether ether ketone polymer.

17. The apparatus of claim 16, wherein the polyether ether ketone polymer is disposed by extruding the polyether ether ketone polymer.

18. The apparatus of claim 16, wherein the polyether ether ketone polymer comprises a single piece of the polyether ether ketone polymer.

19. A downhole antenna apparatus, comprising:
   a bulkhead;
   a transition piece coupled to the bulkhead;
   an antenna cable coupled to the transition piece, wherein the antenna cable is electrically coupled to a conductive path in the transition piece and the bulkhead; and
   an electrically insulating coating disposed about the bulkhead, transition piece, and antenna cable, wherein the electrically insulating coating does not flow at temperatures lower than 200 degrees Celsius.

20. The apparatus of claim 19, wherein the electrically insulating coating disposed on the antenna cable comprises a first polymer and the electrically insulating coating disposed on the bulkhead and the transition piece is a second polymer that is a higher strength polymer than the first polymer.

* * * * *